March 26, 1968   W. R. DAVISON ET AL   3,374,630
MARINE PROPULSION SYSTEM
Filed Oct. 3, 1966   4 Sheets-Sheet 1

INVENTORS.
WILLIAM RICHARD DAVISON
CHOATE A. BROWN
BY *Fishman + Van Kirk*
ATTORNEYS.

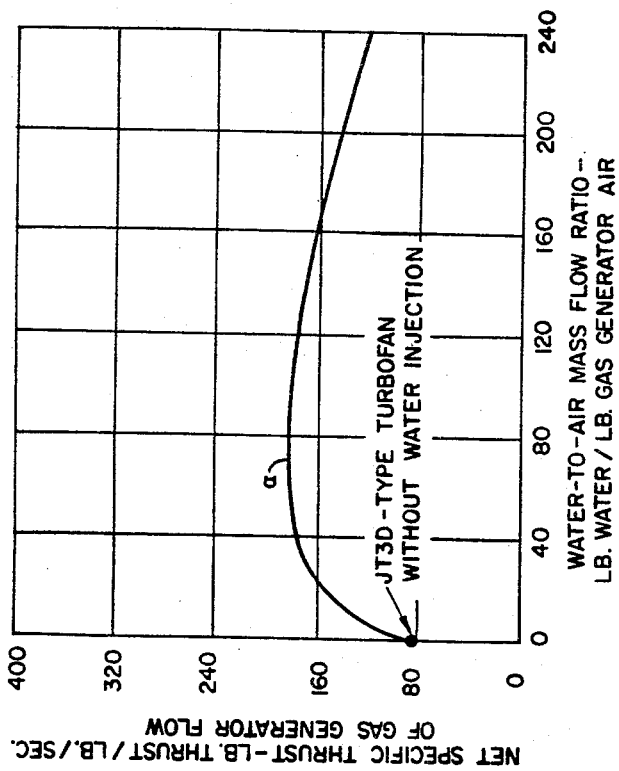
FIG. 4 — Performance of turbofan engine with bypass duct pump water injection. Marine vehicle speed — 50 knots.
FIG. 3 — Performance of turbofan engine with bypass duct water injection. Marine vehicle speed — 50 knots.

March 26, 1968     W. R. DAVISON ETAL     3,374,630
MARINE PROPULSION SYSTEM
Filed Oct. 5, 1966     4 Sheets-Sheet 3
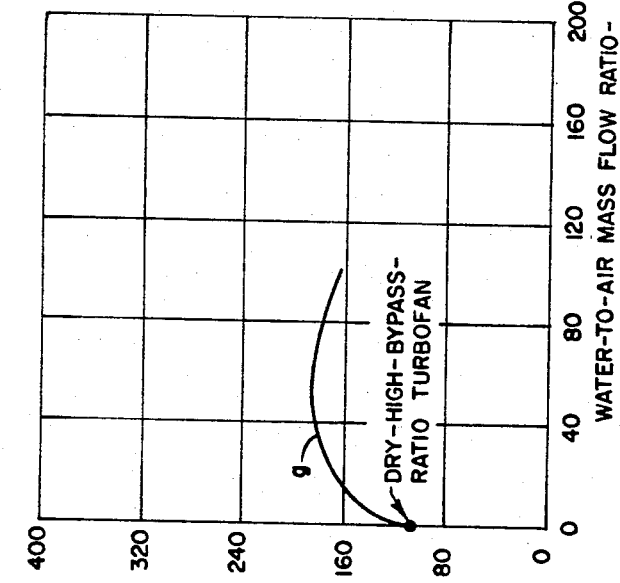
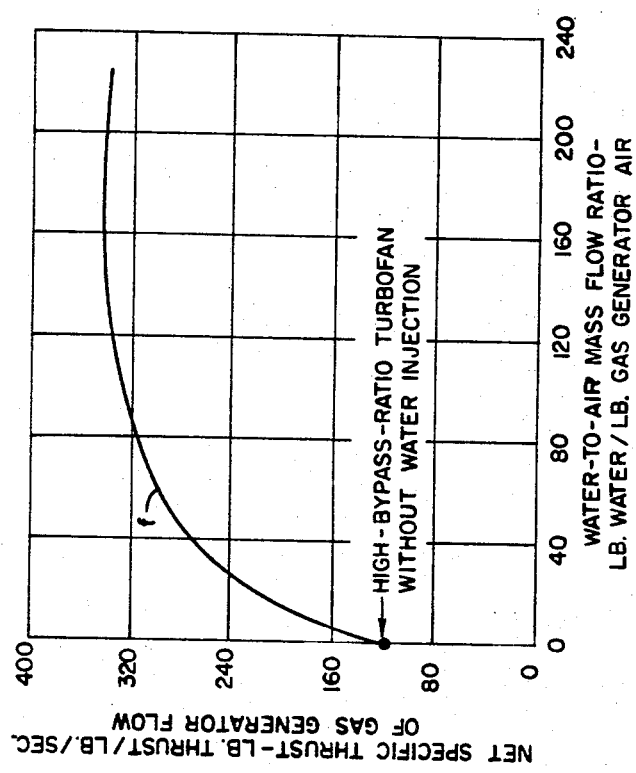

United States Patent Office 3,374,630
Patented Mar. 26, 1968

3,374,630
MARINE PROPULSION SYSTEM
William R. Davison, Wapping, and Choate A. Brown, Vernon, Conn., assignors to United Aircraft Corporation, East Hartford, Conn., a corporation of Delaware
Filed Oct. 3, 1966, Ser. No. 583,862
8 Claims. (Cl. 60—226)

This invention relates to a propulsion system for a marine vehicle. More particularly, this invention relates to a propulsion system for a marine vehicle wherein an engine, preferably the gas generator of a turbofan engine, drives a compressor, preferably the fan of a turbofan engine, to supply large amounts of air to a propulsive duct, preferably a fan air bypass duct for a turbofan engine, and wherein large amounts of water are injected into the air propulsion duct to create a mixed propulsive stream of air and water.

Recently, considerable emphasis has been placed on the selection and design of efficient, lightweight propulsion systems for marine vehicles, such as those of the planing, captured air bubble, and hydrofoil types, capable of operating at speeds of up to 100 knots and more. Two schemes which have evolved from recent investigations in this field are the shaft-turbine drive pump jet (see Water Jet Propulsion for Marine Vehicles, AIAA paper No. 65-245, J. Traskel and W. E. Beck presented at San Diego, Calif., March 1965) and the shaft-turbine drive supercavitating propeller (see Hydrofoil Propulsion System and Design, SNAME paper No. 2-g, J. F. Dunne, presented at Seattle, Wash., May 1965). However, both the pump jet and the supercavitating propeller have the serious disadvantage of high weight since the pump jet component and the supercavitating propeller blade and gear box offset the lightweight feature of the shaft turbine drive. Although aircraft type turbofan engines are relatively light weight, they are not directly applicable to marine applications since they are characterized by low propulsive efficiency and high thrust specific fuel consumption in the range of vehicle speeds up to 100 knots. The present invention results in significant increases in specific thrust and propulsive efficiency and a decrease in thrust specific fuel consumption for aircraft type bypass turbofan engines to make these bypass turbofan engines extremely suitable and attractive for marine propulsion systems while retaining the attractive lightweight characteristics of this type of engine.

Although the present invention is applicable to any engine system in which an engine supplies a stream of unburned air to a propulsive duct having a discharge nozzle and to which water is then injected, the invention will be described with reference to its preferred embodiment of a bypass type turbofan engine wherein the fan air flows through a bypass duct and is discharged rearwardly of the engine through an exhaust nozzle without mixing with the main engine gas stream and without any burning in the bypass duct.

As disclosed in the present invention, water, obtained from a body of water in which the marine vehicle is to be propelled, is injected at large rates of flow into the bypass air stream of a bypass type of turbofan engine. The injected water mixes with the relatively cool and unburned air in the bypass stream and is then discharged through the bypass duct exhaust nozzle. Mixing the injected water with the relatively cool and unburned air in the bypass duct results in little or minimal change of phase in the mixing process, thereby decreasing the large thrust loss which would be associated with a phase change.

Analyses of bypass type turbofan engines incorporating the present invention of water injection into the unburned air in the bypass duct have been performed for systems in which the water is injected through ram pressure and for systems in which water is injected through a pump. These analyses show that the thrust of a bypass type of turbofan engine can be increased by approximately 200 percent for a ram water injection system and by approximately 310 percent with a pump water injection system. Thus, the specific thrust and propulsive efficiency of bypass type turbofan engines can be increased, and the thrust specific fuel consumption of this type of engine decreased so that use of the relatively lightweight bypass turbofan engine becomes practical for marine propulsion without the need to add supplementary propulsive machinery such as propellers.

A related invention concerning water injection into the exhaust duct of a straight turbojet engine or into the exhaust duct of a mixed flow turbofan engine wherein fan flow is mixed with gas generator flow prior to exhaust is disclosed and claimed in a United States patent application for Marine Propulsion System by A. E. Wetherbee, Jr. filed contemporaneously herewith and assigned to assignee of this application.

Accordingly, one object of the present invention is to provide a novel propulsion system for marine vehicles.

Another object of the present invention is to provide a novel propulsion system for marine vehicles wherein the propulsion is supplied directly by a bypass type turbofan engine.

Still another object of the present invention is to provide a novel propulsion system for marine vehicles wherein propulsion is supplied directly by a bypass type turbofan engine, and wherein water is injected in large quantities into and mixed with the airstream in the bypass duct of the turbofan engine to increase engine thrust, increase engine propulsive efficiency, and decrease thrust specific fuel consumption.

Still another object is to provide a novel propulsion system for marine vehicles in which water is injected into and mixed with a propulsive stream with little or minimal change of phase thereby closely approaching full benefit of the injection process.

Other objects and advantages will be apparent from the following detailed description and drawings.

In the drawings wherein like elements are numbered alike in each figure:

FIGURE 3 is a performance chart for the engine of FIGURE 1 showing improved bypass turbofan engine performance with ram water injection in accordance with the present invention.

FIGURE 4 is another performance chart for the engine of FIGURE 1 showing improved bypass turbofan engine performance for varying injection water velocities with pump water injection in accordance with the present invention.

FIGURES 5 and 6 are other performance charts for the high bypass engine of FIGURE 2 showing improved bypass turbofan engine performance for varying vehicle speeds with water injection in accordance with the present invention.

Figure 1:
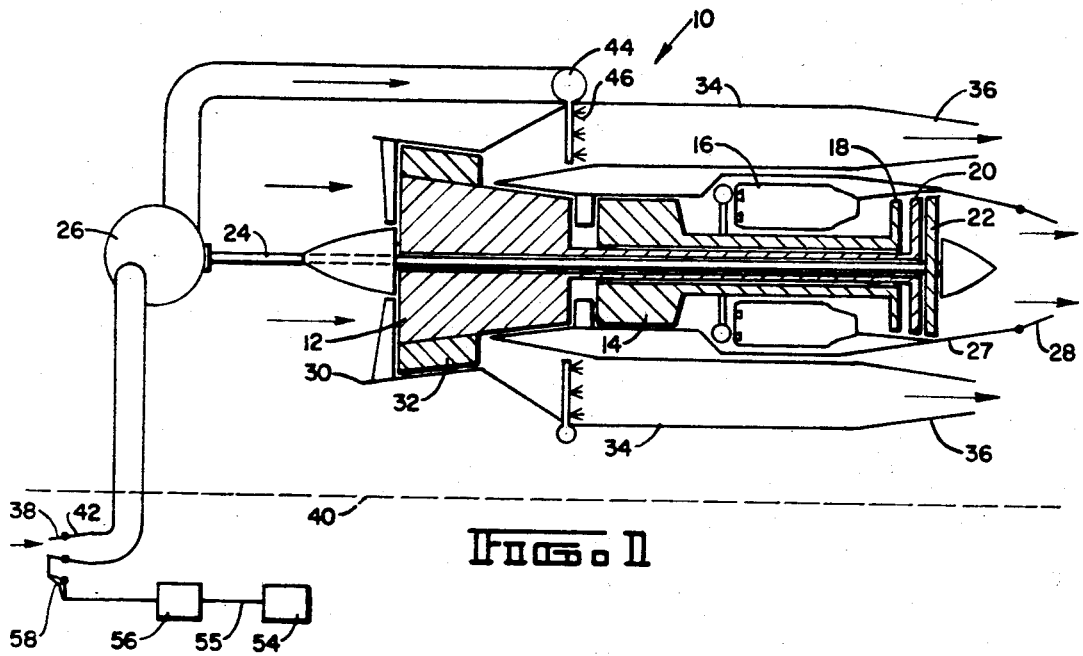
FIGURE 1 is a view, partly in section, of a bypass type turbofan engine incorporating the present invention.

Referring now to FIGURE 1, a bypass turbofan engine 10 is shown. The present invention will be described in connection with an engine similar to the JT3D engine of Pratt and Whitney Aircraft Division of United Aircraft Corporation. Thus, the main engine or gas generator section of turbofan engine 10 has a low pressure compressor 12, a high pressure compressor 14, a burner or combustion section 16, a high pressure turbine 18 connected to and driving high pressure compressor 14, and a low pressure turbine 20 connected with and driving low pressure compressor 12, the shaft connections between each turbine and the compressor it drives being coaxial in the well known manner. As shown in FIGURE 1, the gas generator section also contains a free turbine 22 which is connected via a shaft 24 to a pump 26. Shaft 24 is shown coaxial with the two coaxial turbine-compressor unit shafts in the gas generator; however, it will be understood that pump 26 can be driven by any other known arrangement. Downstream of the turbines there is a tailpipe duct 27 and an exhaust nozzle 28 which may be of variable area if desired.

Although the invention will be described in connection with JT3D type engines, it will be understood that the invention is equally applicable to any type of bypass turbofan engine, whether single spool or twin spool.

In the standard mode of operation of bypass turbofan engine 10, air as indicated by the arrows enters an air inlet duct 30, and part of the air passes through low pressure compressor 12 and high pressure compressor 14 in series for compression to a pressure level suitable for use in the engine. The compressed air is then delivered from high pressure compressor 14 to burner section 16 where fuel is added and burned to form a high energy engine gas stream. This high energy engine gas stream then flows through turbines 18 and 20 in series where some of the energy is extracted to power the turbines for driving the compressors. The gas stream would then flow through tailpipe duct 27 and exhaust nozzle 28 as indicated by the arrows and would be discharged rearwardly through exhaust nozzle 28 for the generation of forward thrust.

An extension section of compressor 12 forms the fan 32, and part of the air entering air inlet 30 is drawn through fan 32 for delivery to a bypass duct 34 which may be either annular or bifurcated as known in the art. Fan 32 introduces large amounts of compressed air to bypass duct 34, and the compressed air in bypass duct 34 is discharged rearwardly as shown by the arrows through a fan exhaust nozzle 36 for the generation of additional thrust. It will be observed that engine 10 is referred to as a bypass turbofan engine because the air from fan 32 completely bypasses the gas generator section of the engine and is discharged through its own exhaust nozzle without taking part in any combustion and without rejoining the gas generator exhaust stream in the engine.

With the exception of the mention of free turbine 22 and pump 26, the system described to this point is in accordance with the basic general concept and operation of a conventional bypass turbofan engine.

Engine 10 is mounted in any convenient manner on the marine vehicle (not shown) to be propelled, such as a planing boat or a hydrofoil. The direction of forward motion of the marine vehicle to be propelled is opposite to the direction of the air flow arrows indicated in FIGURE 1.

In accordance with the present invention, water is introduced to the engine system to make the bypass turbofan engine a more attractive unit for marine propulsion, especially in the speed range of up to 100-150 knots. Water is inducted into this system through a ramscoop 38 submerged below the surface line 40 of the body of water in which the vehicle is to be propelled. Ramscoop 38 faces in the direction of forward motion of the vehicle. Part or all of the pressure head of injection water is created by the transformation of the kinetic energy of the water due to the forward velocity of the marine vehicle, and hence the forward velocity of ram water scoop 38. The water captured by ramscoop 38 is diffused in a diffuser 42, and is then pumped by pump 26 and delivered to a water manifold 44. Pump 26 is powered by free turbine 22; however, it will be understood that pump 26 and free turbine 22 can be eliminated from the system, in which event the entire pressure head of injection water will be created by the transformation of kinetic energy of the inducted water. From manifold 44 the water is then delivered via an array of spray nozzles 46 to the interior of bypass duct 34. If bypass duct 34 is an annular duct around the engine, the array of spray nozzles 32 is preferably a circular array around the interior of bypass duct 34; however, if the bypass ducting is a bifurcated ducting arrangement, then nozzles 46 would preferably be arranged in a circular array in each of the bifurcations.

The water is sprayed into bypass duct 34 in atomized form in droplets preferably less than $1000\mu$ diameter, and it mixes with the compressed fan air normally flowing through bypass duct 34. The mixture of water and unburned fan bypass air is then exhausted as a mixed stream through fan exhaust nozzle 36. Relatively large amounts of water are inducted into the system in accordance with the present invention, the water-to-air flow ratio for several analyzed situations ranging to over 200/1. Exhaust nozzle 36 should be larger than normal in view of the presence of water in the exhaust stream, and nozzle 36 may have to be divergent or convergent-divergent in the event that the exhaust stream is supersonic in relation to the speed of sound in the mixed stream of water and air flowing through the nozzle. Performance characteristics of the system depicted in FIGURE 1, both with and without pump 26 and free turbine 22, have been analyzed and will be discussed hereinafter.

Figure 2:
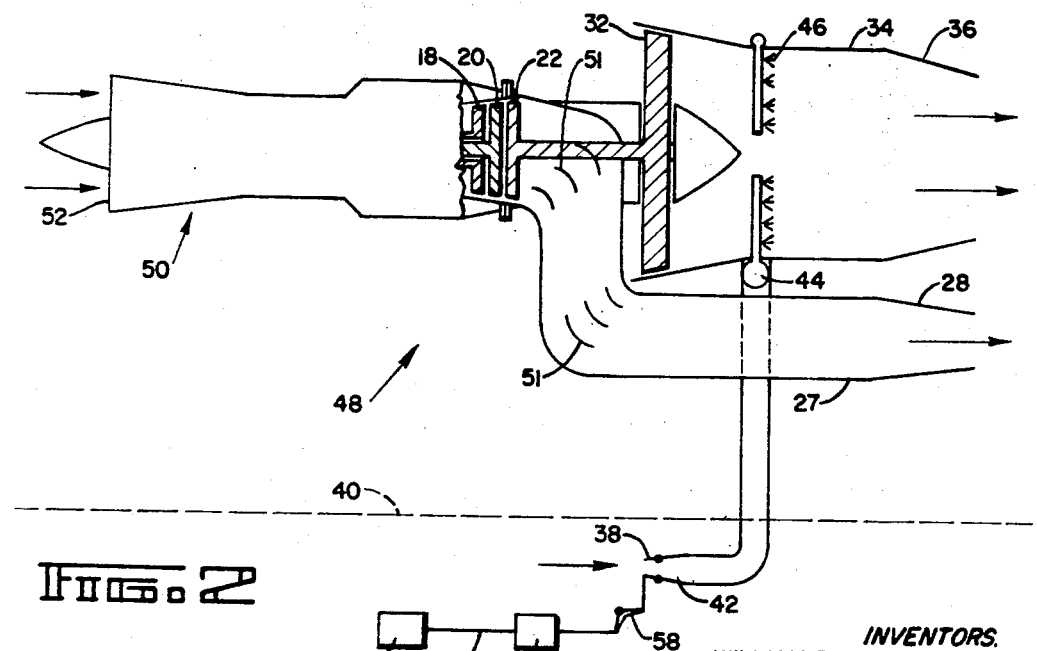
FIGURE 2 is a view, partly in section, of another bypass type turbofan engine of higher bypass ratio incorporating the present invention.

Referring now to FIGURE 2, an arrangement for a high bypass engine 48 is shown. Similarly to engine 10 of FIGURE 1, bypass turbofan engine 48 has a gas generator unit indicated generally at 50 which is comprised of compressors and a burner section as described with respect to engine 10 and the high and low pressure turbines 18 and 20, respectively, as shown. The fan 32 and bypass duct 34 for the bypass unit of engine 48 are part of an add-on unit along with the water injection structure. Fan 32 is driven by a free turbine 22 which may also be part of the add-on unit. Engine 48 includes a water injection system for delivering an atomized spray to bypass duct 34, the water injection system including ramscoop 38, diffuser 42, manifold 44 and spray nozzles 46 as described with respect to engine 10.

The turbofan bypass engine of FIGURE 2 is contemplated to have a JT3 Pratt and Whitney Aircraft type engine as gas generator 50, with turning vanes 51 directing the gas generator flow to exhaust nozzle 28. It will be observed that the engine is again a pure bypass engine in that the fan air going through duct 34 is exhausted directly to atmosphere through exhaust nozzle 36 without taking part in any combustion and without rejoining the gas generator stream in tail pipe duct 27.

In the operation of the engine in FIGURE 2, air enters gas generator inlet 52, and is compressed and burned within gas generator 50 in a well known fashion, the combustion gases then passing through turbines 18 and 20 (and also free turbine 22) and thence through tail pipe 27 and exhaust nozzle 28 to be discharged rearwardly for the generation of forward thrust. Fan 32 supplies large amounts of compressed but unburned air to bypass duct 34. Water is inducted into the engine through submerged ramscoop 38, and the water is delivered via diffuser 42, manifold 44 and spray nozzles 46 to the interior of bypass duct 34. The water is sprayed into duct 34 in an atomized flow and mixes with the fan air from fan 32 to form a mixture of air and water for discharge through exhaust nozzle 36 for the generation of forward thrust. With respect to the engine of FIGURE 2, it is contemplated that the fan-to-gas generator air flow ratio will be even higher than the FIGURE 1 engine; on the order of 4/1. As pointed out with respect to FIGURE 1, the exhaust nozzle 36 of the FIGURE 2 engine should be larger than normal and may have to be divergent or convergent-divergent. Analyses with the engine of FIGURE 2 have also been conducted with water-to-air flow ratios of up to 200/1 and more.

Merely by way of example to demonstrate that the concept of the present invention of water injection into the bypass duct of a bypass turbofan engine can make aircraft type turbofan engines of interest in marine propulsion applications, results are presented in FIGURES 3 through 6 of analyses of engines corresponding to the engines shown in FIGURE 1 and FIGURE 2. In performing the analyses, a Pratt and Whitney JT3D-type engine was employed as the bypass turbofan of FIGURE 1, and it was assumed that the bypass turbofan of FIGURE 2 was a Pratt and Whitney JT3-type engine used as a gas generator with fan 32 and bypass duct 34 being an add-on unit. Performance calculations for the water injected bypass turbofan engines of FIGURES 1 and 2 where conducted with water-to-air mass flow ratios in the range from zero to over 200, the zero ratio corresponding to no water injection. In all cases where water-to-air mass flow ratios are mentioned, the ratio is based on gas generator airflow and does not include fan airflow. The water-to-air flow ratio was systematically increased from zero until results indicated that further increases would result in a reduction of specific thrust or that, with a pump present in the water injection system, the requiremen for additional injection water pump power was beyond that which was available from the power turbine.

Engine specific thrust (pound of thrust per pound per second of gas generator mass flow) is based on the summation of the thrust of the gas generator air and fan discharge water-air mixture, less the inlet water and inlet air drag terms. In order to compar ethe performance of each engine on the same basis, the system propulsive efficiency was also considered, system propulsive efficiency being defined as the product of the power turbine efficiency and the thrust horsepower divided by the gas horsepower available from the gas generator (i.e., gas horsepower generated by the gas generator minus that used in driving the compressors of the gas generator but not the fan).

The performance calculations employed a 0.70 ram pressure recovery factor, defined as the fraction of the dynamic pressure head created by the forward velocity of the vehicle that is recovered in the water inlet of ramscoop 38. This factor is representative of the fraction of the initial free stream dynamic pressure head that is recovered after water has passed through the water delivery system. Calculations were made for marine vehicle speeds of 50 knots and 100 knots, and calculations were also made with the speed of water injected into the fan stream varying from 25 percent to 100 percent of the fan air stream speed.

Referring now to FIGURE 3, the analyzed performance of a JT3D-type bypass turbofan engine with bypass duct ram water injection used to propel a 50 knot marine vehicle is presented in line $a$ as a function of specific thrust versus water-to-air mass flow ratio. As indicated, the starting point on line $a$ corresponds to a condition of no water injection. It can be seen that increases in water-to-air mass flow ratio for this engine results in a rapid increase in specific thrust up to a water-to-air mass flow ratio of about 40, and then a less gradual increase to a maximum specific thrust of about 182 lbs./lbs./sec., and then a gradual decrease in specific thrust as the water-to-air mass flow ratio is further icreased. The maximum specific thrust of approximately 182 lbs./lbs./sec. corresponds to approximately 110 percent thrust augmentation relative to the thrust of this engine without water injection, and the system propulsive efficiency is calculated to be approximately 22 percent at the point of maximum specific thrust.

The specific thrust and system propulsive efficiency increases indicated in FIGURE 3 occur because of the increased mass flow through the fan duct 34 of the engine of FIGURE 1 and because of the reduced velocities in the fan discharge nozzle 36. The reduced fan discharge nozzle velocity results from the acceleration of the large mass of injected water by the air stream during expansion in the exhaust nozzle 36. Very little of the injected water is evaporated because the unburned fan air is at a relatively low temperature, and therefore, the exhaust through nozzle 36 consists primarily of a mixture of liquid water droplets and air. The eventual decrease in specific thrust with increasing water-to-air mass flow ratio is the result of the increasing influence of the water inlet momentum drag as increasing amounts of water are injected into duct 34.

Referring now to FIGURE 4, analyzed results are presented for the performance of the JT3D-type engine of FIGURE 1 with water pump 26 and free turbine 22 included in the system. The results presented in FIGURE 4 are plotted as a function of specific thrust versus water-to-air mass flow ratio at varying water speeds for water injection into duct 34. The lines $b$, $c$, $d$, and $e$ in FIGURE 4 represent percentages of the velocity of water injected into duct 34 to the velocity of fan air in duct 34 of 25 percent, 50 percent, 75 percent and 100 percent, respectively.

As seen in FIGURE 4, the maximum specific thrust for the system of FIGURE 1 with pump feed water injection is 358 lbs./lbs./sec. of gas generator flow which corresponds to a system propulsive efficiency of approximately 42 percent and a thrust augmentation, relative to the engine without water injection, of 310 percent.

It can be seen from FIGURE 4 that there is a significant increase of specific thrust with increased water injection velocity at most water-to-air mass flow ratios, provided there is sufficient power available from free turbine 22 to drive the water pump. The water injection velocity is a measure of the pressure to which the water must be pumped before it is sprayed into the fan discharge air stream in duct 34, higher pump pressures being required as water injection velocity increases. The specific thrust increase with increasing water injection velocity results from the fact that, as the water injection velocity approaches the velocity of fan air, less momentum is lost in the momentum exchange between the air and the injection water. Notwithstanding the fact that a discrete number of injection velocities were considered, the trend of specific thrust increase with injection velocity is apparent at every water-to-air mass flow ratio considered.

As was the case for the engine system of FIGURE 1, an eventual decrease in specific thrust with increasing water-to-air mass flow ratio results because of the increasing influence of the water inlet momentum drag as the mass of injected water increases.

The terminal points which define the dashed portion of the uppermost curve in FIGURE 4 are reached when 100 percent of the gas horsepower available from the gas generator is used to drive the water pump. This envelope defined by the uppermost curve of FIGURE 4 encloses a region which defines water injection velocities and water-to-air mass flow ratios at which the engine of FIGURE 1 with pump water injection could operate.

Referring now to FIGURE 5, results are presented in line $f$ for calculations regarding the operation of the engine of FIGURE 2 to propel a marine vehicle at 50 knots. As in the previous charts, the results in FIGURE 5 are presented as a function of specific thrust versus water-to-air mass flow ratio. As can be seen, specific thrust increases rapidly with increased water-to-air mass flow ratio to a maximum specific thrust of approximately 341 lbs./lbs./sec. of gas generator flow which corresponds to slightly less than 200 percent thrust augmentation relative to the thrust of this engine without water injection, and system propulsive efficiency is calculated to be approximately 41 percent for this maximum specific thrust. Once again, specific thrust begins to decrease for increased water-to-air mass flow ratios on a certain ratio.

The calculations on which the results of FIGURE 5 were based contemplate a high bypass ratio for the turbofan engine of FIGURE 2, the bypass ratio being on the order of 4 to 1 for the ratio of air entering fan 32 to air entering air inlet 52. Since the high bypass ratio turbofan engine in FIGURE 2 does not require a mechanical water pump to achieve high system propulsive efficiency values, the engine of FIGURE 2 may be a particularly attractive and efficient system for marine propulsion applications, especially since the significant estimated performance increases and improvements can be obtained with only a small increase in weight to account for ducting and spray equipment.

Referring now to FIGURE 6, results are presented in line g for the engine of FIGURE 2 used to propel a marine vehicle at a speed of 100 knots rather than the speed of 50 knots at which the results were compiled for FIGURE 5. The maximum specific thrust performance of the engine of FIGURE 2 at a vehicle speed of 100 knots is estimated to be approximately 182 lbs./lbs./sec. of gas generator flow, and this thrust level corresponds to a propulsive efficiency of 46 percent. However, it should be pointed out that at 100 knots speed, water injection augments the thrust of the turbofan engine by less than 100 percent relative to the thrust without water injection. Increased ramscoop inlet drag is primarily responsible for the limited system propulsive efficiency increase over the system propulsive efficiency at 50 knots. It should also be borne in mind that the aircraft-type engine is better matched to the speed of the vehicle at 100 knots than at 50 knots.

The foregoing discussion has been directed to a constant inlet area for ramscoop 38. However, when no pump is used to pressurize the water to be injected into the fan discharge duct, problems of metering the correct water flow to the engine may be created when the marine vehicle is operating at off design conditions. These problems may be overcome by controlling the size of the inlet of ramscoop 38 as a function of vehicle speed. Accordingly, a signal of vehicle speed as sensed by speed sensor 54 is delivered via line 55 to a governor mechanism 56. Any speed signal may be employed depending on the nature of governor 56. Governor 56 receives the speed signal and operates through bell crank 58 to vary the inlet area of ramscoop 38, bell crank 58 being connected to any type of well known variable flow area structure at the inlet to ramscoop 38.

With the use of variable area inlet structure for ramscoop 38, the maximum thrust of which a turbofan engine is capable may be obtained by a boot strap method wherein higher thrusts and higher vehicle speeds are achieved with increased water flow through the intake of ramscoop 38 and wherein increased water flow occurs when higher vehicle speeds are attained which operate through governor 56 to increase the inlet area of ramscoop 38. In addition, by varying the size of the inlet to ramscoop 38, the engine is better suited for operation at vehicle speeds other than the design speed.

Additional performance advantage can be gained by aiming the exhaust, especially the fan duct exhaust, of the engines of FIGURES 1 and 2 downward at a small angle. This downward direction of the exhaust toward the body of water in which the marine vehicle is to be propelled produces considerable lift at a small cost in thrust for those systems such as hydrofoils wherein lift is desired. By way of example, for a hydrofoil vessel at 40 knots, a downward angle of 10° for the engine exhaust will produce a lift equal to approximately 15 percent of the vessel gross weight at a cost of approximately 2.5 percent in net thrust.

Figure 7:
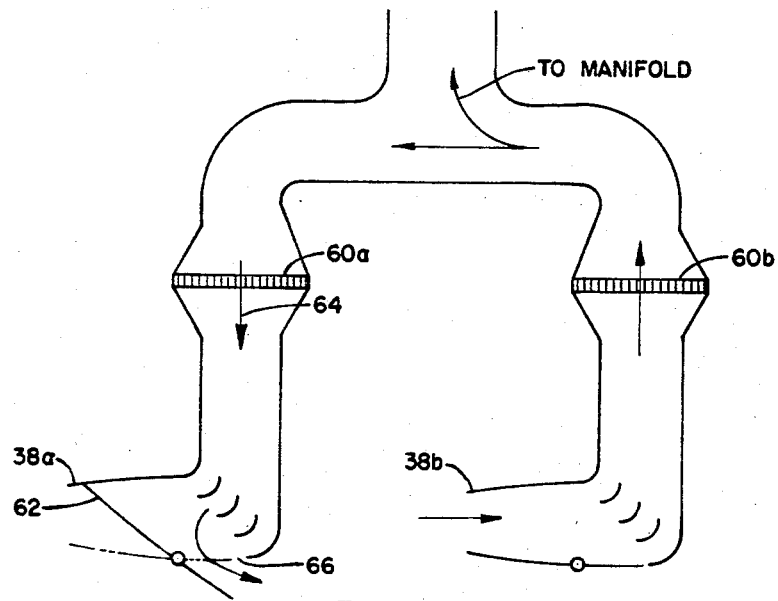
FIGURE 7 is a schematic showing of an anticlogging system to prevent fouling of the water injection system of the present invention.
Figure 8:
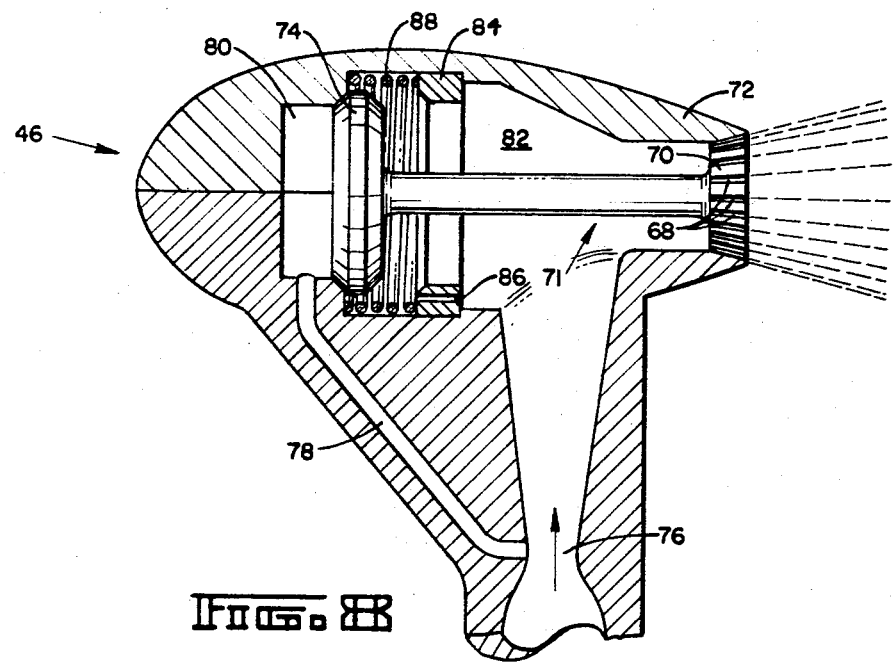
FIGURE 8 is a view, partly in section, of another anticlogging mechanism to prevent fouling of the water injection system of the present invention.

Referring now to FIGURES 7 and 8, two approaches are shown for preventing the clogging of spray nozzles 46 with seaweed or other debris.

Referring to the structure shown in FIGURE 7, a pair of water inlets 38a and 38b are shown operating in parallel. These parallel water inlets 38a and 38b may each be a separate ramscoop such as the ramscoop 38 of FIGURE 1 or FIGURE 2, or these water inlets may parallel flow paths from a single ramscoop. It will be understood that any number of parallel operated water inlets can be employed, two being shown in FIGURE 7 for ease of illustration. Each water inlet leads to a filter screen, inlet 38a leading to screen 60a and inlet 38b leading to screen 60b. Inducted water flows through the parallel inlets 38a and 38b and through the screens 60a and 60b for delivery to manifold 44 as previously described. When one of the screens becomes clogged, for example screen 60a, a valve 62 in the corresponding water inlet is actuated to close the normally open inlet 38a, and water flow to screen 60a is then reversed as indicated by arrow 64, and debris is cleared from the screen and washed out through openings 66, openings 66 normally being closed but being uncovered from the reverse flow of water by the actuation of valve 62. In a similar manner, if screen 60b were clogged, water inlet 38b would be closed off and water would be caused to reverse flow through screen 60b to flush the screen.

Referring now to FIGURE 8, another approach is shown for preventing clogging of the water injection system. In the FIGURE 8 embodiment, the spray nozzles 46 are individual self-cleaning nozzles. The spray orifices consist of a number of slots 68 in the seating surface of a spray poppet 70 of assembly 71.

Poppet 70 is normally seated in spray head housing 72 by the action of a connected control poppet 74 which has a larger pressure responsive cross-sectional area than poppet 70. The water flowing to spray poppet 70 flows through a venturi 76, and the pressure at the throat of the venturi is delivered via a line 78 to a chamber 80 on the back (left) side of control poppet 74. The pressure of the fluid discharging from the venturi to chamber 82 of the spray head acts on the front (right) side of the control poppet 74, and a pressure differential is thus established across control poppet 74 from right to left urging control poppet 74 and spray poppet 70 to the left since the pressure at the throat of venturi 76 is less than the discharge pressure from the venturi. The spray head will remain in the position shown in FIGURE 8 so long as the spray slots 68 remain unclogged.

When the spray slots 68 become clogged, the pressure differential generated by the venturi decreases because of the decreased flow through the spray slots and the venturi. With the decreased pressure differential across control poppet 74, the pressure inside chamber 82 acting on spray poppet 70 forces poppet assembly 71 to the right to open a gap between spray poppet 70 and housing 72. During the opening process control poppet 74 also moves to the right, and the pressure differential across control poppet 74 goes to zero by virtue of the leakage around it and despite the fact that flow is now increasing in the venturi. Poppet assembly 71 moves in an opening direction to the right until control poppet 74 seats on a follower ring 84. When control poppet 74 seats on ring 84 the pressure differential across control poppet 74 again builds up because the leakage around control poppet 74 is stopped. The pressure differential moves the poppet assembly and follower ring 84 to the left until control poppet 74 returns to its original position and spray poppet 70 seats in housing 72. An orifice 86 in follower ring 84 allows pressure equalization across the follower ring so that spring 88 can return the follower ring to its original position. The entire cycle of opening and closing to clean the poppet head 78 of accumulated debris should take place in a fraction of a second so that the slug of water released when poppet valve 70 opens should not noticeably affect system performance.

While preferred embodiments have been shown and described, various modifications and substitutions may be made without departing from the spirit and scope of this invention. Accordingly, it is to be understood that this invention has been described by way of illustration rather than limitation.

What is claimed is:

1. A propulsion system for propelling a marine vehicle through water including:
   air stream propulsive duct means mounted on the vehicle to be propelled;
   exhaust nozzle means at the discharge end of said propulsive duct;
   engine means for generating an airflow stream through said duct means and said exhaust nozzle means for the generation of a propulsive stream;
   water intake means for inducting water into the propulsive system; and
   water delivery means connected from said water intake means to said duct means upstream of said exhaust nozzle means for delivering water to said duct means for injecting into and mixing with said airflow stream in said duct means to produce a mixed stream of air and water for discharge through said exhaust nozzle.

2. A propulsion system as in claim 1 wherein:
   said delivery means includes injection nozzle means, said injection nozzle means delivering water to said duct means in an atomized spray.

3. A propulsion system as in claim 2 wherein:
   said delivery means includes manifold means connected to receive water from said intake means and deliver water to said injection nozzle means.

4. A propulsion system as in claim 1 wherein said delivery means includes pump means for pumping water from said intake means to said duct means.

5. A propulsion system as in claim 1 wherein:
   said engine means is a bypass turbofan gas turbine engine;
   said bypass turbofan gas turbine engine having a main engine combustion gas passage for discharging combustion gases from the turbine of said gas turbine engine; and wherein
   said duct means is a bypass airflow passage from the fan of said turbofan engine to said exhaust nozzle means at the discharge end of said duct means, said bypass airflow passage being separate from said main engine combustion gas passage.

6. A propulsion system as in claim 5 wherein:
   said delivery means includes pump means for pumping water from said intake means to said duct means; and including
   free turbine means connected to drive said pump means, said free turbine means being powered by the combustion gas discharge from the turbine of said gas turbine engine.

7. A propulsive system as in claim 1 including:
   area control means connected to said water intake means for varying the area of said water intake means.

8. A propulsive system as in claim 7 wherein said area control means includes means responsive to the speed of the vehicle to be propelled for varying the area of said water intake means as a function of vehicle speed.

References Cited

UNITED STATES PATENTS

| 2,505,660 | 4/1950 | Baumann | 60—226 |
| 2,912,188 | 11/1959 | Singelmann et al. | 60—226 XR |
| 3,314,391 | 4/1967 | Duport | 60—221 XR |

FOREIGN PATENTS

| 920,205 | 10/1954 | Germany. |

CARLTON R. CROYLE, *Primary Examiner.*